Nov. 18, 1958     H. M. WOODALL ET AL     2,861,140
GALVANOMETER
Filed Oct. 3, 1956
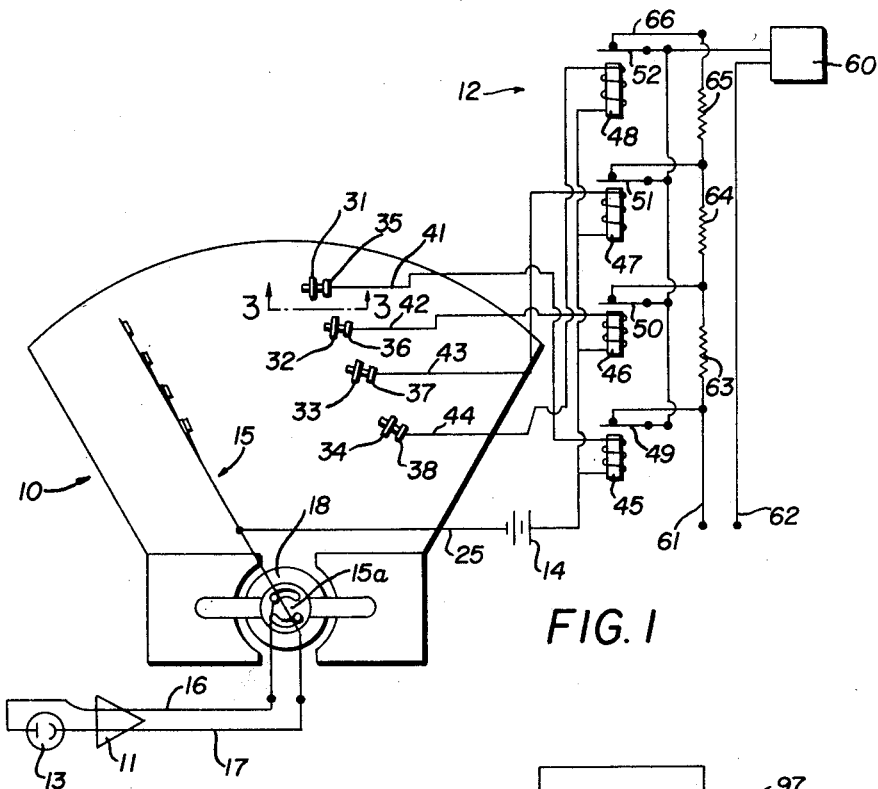
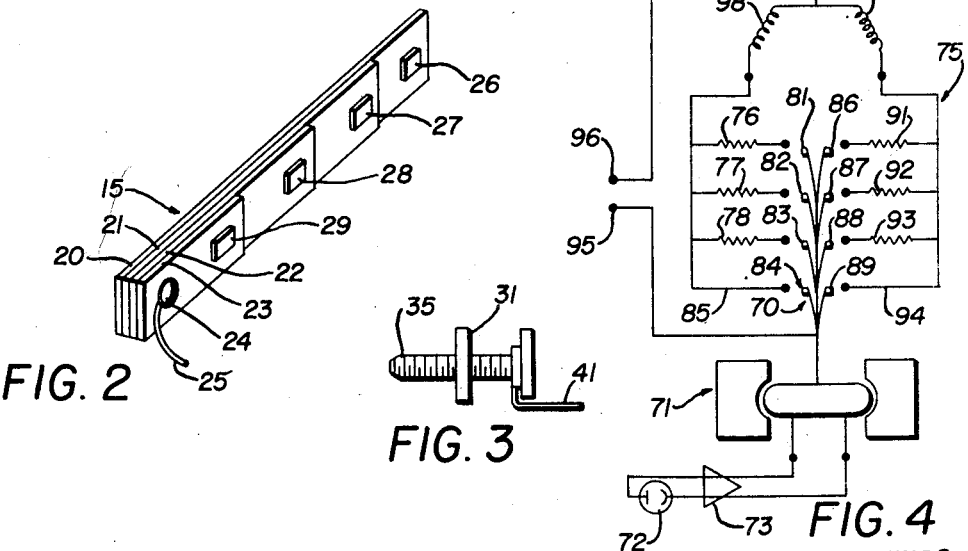
INVENTORS
HARRY M. WOODALL
& ELIZABETH R. WOODALL
BY
ATTORNEY United States Patent Office 2,861,140
Patented Nov. 18, 1958

2,861,140
GALVANOMETER

Harry M. Woodall and Elizabeth R. Woodall, Akron, Ohio

Application October 3, 1956, Serial No. 613,720

8 Claims. (Cl. 200—56)

This invention relates to the art of electrical measuring devices and in particular has reference to improvements in galvanometers or other similar devices employed in measuring the flow of electric current across a given point.

It has been long known in the art of electrical measurement that galvanometers and other devices can be employed for accurately measuring current flow across a given point, either by indicating the number of volts, as is the case in a galvanometer, or by measuring the degree of current flow in terms of amperage, as is the case in ammeters.

In basic simplicity, a Weston-type galvanometer has achieved the greatest acceptance and encompasses the use of a soft iron cylindrical core suspended between pole pieces having a strip of brass or the like to give a uniform air-gap, together with a radial field. Various methods of dampening these instruments are well known in the prior art so that the movable coil may be used under the more extreme conditions of usage.

It suffices in connection with the description of this invention to state that the moving coil has secured thereto a pointer arm that indicates, through an appropriate dial, the amount of current being received through the galvanometer.

It is with reference to the specific construction of this pointer needle that this invention relates and in this regard it has been discovered that by providing a pointer arm that includes a plurality of independently operable contact arms, that improved results will be obtained.

It has been further discovered that by use of such a multiple contact pointer arm, the galvanometer itself can be utilized as a control element to progressively energize a series of circuits for any one of several different known purposes.

It accordingly becomes a principal object of this invention to provide an improved type of galvanometer characterized by the presence of a pointer arm that includes a series of individual arms biased together and being capable of making successive contacts with contact points provided on the galvanometer, per se.

It is a still further object of this invention to provide an improved type of galvanometer characterized by the presence of an improved type of pointer arm that enables the same to have particular utility as a control device.

It is a still further object of this invention to provide a galvanometer of the type above described that is comprised of a minimum number of component parts resulting in a low cost of manufacture.

These and other objects of the invention will become more apparent upon a reading of the following brief specification, considered and interpreted in the light of the accompanying drawings.

Of the drawings:

Figure 1 is a semi-schematic view of the improved galvanometer incorporated in a condition-responsive control circuit.

Figure 2 is a prospective view illustrating the detailed condition of the improved pointer arm.

Figure 3 is a section taken on the lines 3—3 of Figure 1.

Figure 4 is a semi-schematic view of a modified form of pointer arm installed on the galvanometer.

Referring now to the drawings and in particular to Figure 1 thereof, the improved galvanometer, generally indicated by the numeral 10, is shown interposed between an amplifier 11 and a condition-responsive circuit 12 that is progressively actuated as will presently be described as a result of a varying degree of current being emitted from a photo-electric cell 13.

Considering first the structure of the galvanometer 10, it will be seen from the drawings that the same is of known construction with the exception of the construction of the pointer arm 15, as well as certain component parts associated therewith. It accordingly suffices to say with regard to the description of the galvanometer that current flowing across lines 16 and 17 creates a field with respect to movable coil 18 that, in turn, causes the pointer arm 15 to move clockwise of Figure 1 of the drawings.

As is best shown in Figure 2, the pointer arm 15 includes a plurality of thin elongate arm members 20, 21 and 22 and 23, the arrangement being such that the contact arm 20 is the longest with the contact arm 23 being the shortest of the above described series of arms.

In order that the arms may move together upon increase in voltage across the lines 16 and 17, the same may be (see Figure 2) secured together by a screw 24, with a conducting wire 25 being shown, for clarity, extending therefrom for connection with a condition-responsive circuit 12 as will presently be described, with battery 14 being interposed in this line. Additionally, contact points are shown provided upon the respective arms with contact members 26, 27, 28 and 29 being respectively provided on contact arms 20, 21, 22 and 23.

To facilitate progressive contact of the type required, the face 30 of the galvanometer 10 further includes a series of upright stud members 31 and 32, 33 and 34, that respectively receive therethrough, as shown in Figure 3, screw members 35, 36, 37 and 38. In this manner, wires 41, 42, 43 and 44 can be respectively secured to the screw members 35, 36, 37 and 38 to facilitate introduction of current from these contact points to the condition responsive control circuit 12.

Considering next the structure of the condition-responsive control circuit 12 that is illustrated in the preferred embodiment of the invention, it will be seen that the same includes a plurality of core members 45, 46, 47 and 48, each of which is disposed adjacent relay members 49, 50, 51, and 52 respectively, with lead wires 41, 42, 43 and 44 respectively, coiled about the core members 45, 46, 47 and 48, to effectuate successive energization of the relay members 49, 50, 51 and 52.

In order that this just-described circuit may be utilized to alter the degree of current flowing into a load 60 through lines 61 and 62 respectively, a line 61 is shown provided with resistances 63, 64 and 65, as well as a branch line 66 that leads to relay member 52.

In use or operation of the improved device, it will first be assumed that the same is employed in connection with a condition-responsive circuit of the type above described, so as to permit the degree of current flowing to load 60 to be inversely proportional to the amount of current being emitted by a photo-electric cell 13. In this regard, a practical application of use for such an arrangement would be to have the photo-electric cell 13 disposed exteriorly of a house, while the load 60 represented the lights in a selected area of the house interior such as the living room. Thus, as darkness approached and the intensity of the photo-electric cell 13 decreased, the amount of current being delivered to the load 60 would accordingly increase to cause the lights to burn more brightly. Conversely, as daylight approaches and more current is emitted from the photo-electric cell 13, more resistance will be placed in the line 61 to decrease the amount of current delivered to load 60.

With the above in mind, it will now be assumed that a relatively small degree of current is being emitted from the photo-electric cell 13 with the result that the voltage across the lines 16 and 17 is negligible to result in minimal deflection of the pointer arm 15. However, as additional voltage is supplied across the lines 16 and 17, the pointer arm 15 will move clock-wise around the pivot point 15a thereof and during this movement the contact 26 will first contact the screw 35. This contact will close a circuit so that the flow will be through line 41 around core 45, for return to the pointer arm 15 through line 25. This just-described flow will cause the relay 49 to open, and as a result of this relay 49 opening, it is believed apparent that current flowing in line 61 will then be forced through resistance 63 to decrease the voltage being delivered to the load 60 as a result of a relay 49 being opened. At this point, only the contact point 26 is in contact, but, however, as further increase in voltage occurs across the lines 16 and 17, the contact 27 will contact screw 36 so as to close the circuit represented by line 42, core 46, and line 25. This will, in turn, trip the relay 50 to break the circuit at this point so that current going through the line 61 will now be forced to pass through resistances 63 and 64. Similarly, when further voltage increase across lines 16 and 17 occurs, the contact point 28 will strike screw 37 to result in relay 51 being opened to thus cause the third resistance 65 to be placed across the load circuit. When the last contact point 29 strikes the screw 38, the relay 52 will open and no current will be delivered to the load 60 as a result of the relay 52 being opened.

It is believed apparent that the converse would occur sequentially upon progressive decreasing of the voltage across lines 16 and 17 with release of contact between members 29 and 38 resulting in a reopening of the circuit to cause limited current to flow to the load 60. Similarly, as the contact points 28, 27, and 26 succesively left their points of contact with their respective screws 37, 36, and 35, the relays 51, 50 and 49 would be progressively closed to cause resumption of current delivered to the load 60.

It will be seen from the foregoing that there has been provided a new and novel type of galvanometer, which, in addition to functioning as a normal galvanometer, has incorporated therein features which render the same usable as a control device having particular utility in condition-responsive control circuits.

The modified form of the invention shown schematically in Figure 4 of the drawings illustrates a modified type of pointer arm 70 that operates off a galvanometer 71 with deflection of the pointer arm 70 occurring upon variation and impulses delivered by a photo-electric cell 72 to an amplifier 73. In this modification, a motor disposed across terminals 95, 96 has the speed and rotational direction thereof controlled by a circuit 75 that is progressively energized upon deflection of pointer arm 70 as will now be described.

Accordingly, the circuit 75 includes a series of resistances 76, 77 and 78 that are arranged for respective contact with contacts 81, 82, and 83 of pointer arm 70 with contact 84 making contact with line 85 for purposes to be described. A similar set of resistances 91, 92 and 93, as well as line 94, are provided for successive engagement with contacts 86, 87, 88 and 89. While fields 97 and 98 are provided for initiating rotation of the motor placed across terminals 95 and 96.

In use or operation of this modified form of the invention, it will be first assumed that the pointer arm 70 is at zero setting when located as shown in Figure 4.

It will be further assumed that upon decrease in current from amplifier 73 the arm 70 will move counter-clockwise to cause energization of field 98 to run the motor in one direction while increase in current will cause arm 70 to move in the opposite direction (clockwise) to excite field 97 and rotate the motor in the opposite direction. During the counter-clockwise movement, the contacts 81, 82, 83 and 84 will progressively contact, while during clockwise movement the contacts 86, 87, 88 and 89 will be progressively placed in the circuit. Thus, additional resistance will be progressively placed in the line to vary the amount of current delivered to either field 97 or 98 to accordingly affect the motor speed in either direction according to the existing conditions.

It accordingly follows that other modifications of the invention may be resorted to without departing from the spirit hereof or the scope of the appended claims.

What is claimed is:

1. An electrical measuring instrument having a dial face and a pointer movable thereacross in response to electrical variations received by said instrument; a plurality of elongate arms arranged in abutted relationship so as to define an aligned longitudinal end that is secured to said pointer for co-extensive projection therewith; said arms being of substantially uniform cross-sectional configuration and varying in longitudinal length whereby the respective projecting ends of said arms are staggered at varying distances from said aligned longitudinal end; and a series of contact points received on said face and being progressively engaged by the staggered projecting ends of said arms upon movement thereof.

2. An electrical measuring instrument having a dial face and a pointer movable thereacross in response to electrical variations received by said instrument; a plurality of elongate arms arranged in abutted relationship so as to define an aligned longitudinal end that is secured to said pointer for co-extensive projection therewith; said arms being of substantially uniform cross-sectional configuration and varying in longitudinal length whereby the respective projecting ends of said arms are staggered at varying distances from said aligned longitudinal end; and a series of contact points received on said face and being progressively engaged by the staggered projecting ends of said arms upon movement thereof; the progressive contact between said arms and said contacts being such that said longest arm is first to contact with said shortest arm being last to contact.

3. An electrical measuring instrument having a dial face and a pointer movable thereacross in response to electrical variations received by said instrument; a plurality of elongate arms arranged in abutted relationship so as to define an aligned longitudinal end that is secured to said pointer for co-extensive projection therewith; said arms being of substantially uniform cross-sectional configuration and varying in longitudinal length whereby the respective projecting ends of said arms are staggered at varying distances from said aligned longitudinal end; and a series of contact points received on said face and being progressively engaged by the staggered projecting ends of said arms upon movement thereof; said arms and said contacts completing when in contact, an electrical circuit.

4. The device of claim 3 further characterized by the fact that said circuit has progressively energizable relays that are progressively operative upon progressive contact between said arms and said contacts.

5. An electrical measuring instrument having a dial face and a pointer movable thereacross in response to electrical variations received by said instrument; a plurality of elongate arms arranged in abutted relationship so as to define an aligned longitudinal end that is secured to said pointer for co-extensive projection therewith; said arms being of substantially uniform cross-sectional configuration and varying in longitudinal length whereby the respective projecting ends of said arms are staggered at varying distances from said aligned longitudinal end; and a series of contact points received on said face and being progressively engaged by the staggered projecting ends of said arms upon movement thereof; at least one contact having adjustment means for varying the point of contact with said arm that engages the same.

6. An electrical measuring instrument having a dial face and a pointer movable thereacross in response to electrical variations received by said instrument; a plurality of elongate arms arranged in abutted relationship so as to define an aligned longitudinal end that is secured to said pointer for co-extensive projection therewith; said arms being of substantially uniform cross-sectional configuration and varying in longitudinal length whereby the respective projecting ends of said arms are staggered at varying distances from said aligned longitudinal end; and a series of contact points received on said face and being progressively engaged by the staggered projecting ends of said arms upon movement thereof; at least one contact having adjustment means for varying the point of contact with said arm that engages the same; said means including a contact screw threaded in a support bracket received on said face.

7. An electrical measuring instrument of the character described, comprising; a housing; a dial face having arcuate graduations; a pointer rotatively mounted in said housing and having its free end portion movable arcuately across said graduations; at least one auxiliary pointer of shorter length having one end thereof secured to said pointer adjacent its point of rotational mounting and having the opposed end disposed radially inwardly from the free end of said pointer; and at least two contacts engageable by the free ends of said pointer and said auxiliary pointer said pointers being of substantially equal cross-sectional configuration.

8. An electrical measuring instrument of the character described, comprising; a housing; a dial face having arcuate graduations; a pointer rotatively mounted in said housing and having its free end portion movable arcuately across said graduations; at least one auxiliary pointer of shorter length having one end thereof secured to said pointer adjacent its point of rotational mounting and having the opposed end disposed radially inwardly from the free end of said pointer; and at least two contacts engageable by the free ends of said pointer and said auxiliary pointer, said contacts being staggered radially and arcuately of said graduations said pointers being of substantially equal cross-sectional configuration.

References Cited in the file of this patent

UNITED STATES PATENTS

| | | |
|---|---|---|
| 493,602 | Shepherd | Mar. 14, 1893 |
| 1,680,690 | Murphy | Aug. 14, 1928 |
| 1,769,279 | True | July 1, 1930 |
| 2,493,060 | Daschke | Jan. 3, 1950 |